United States Patent [19]

Nakajima

[11] Patent Number: 4,726,767
[45] Date of Patent: Feb. 23, 1988

[54] HOT AIRSTREAM GENERATING DEVICE
[75] Inventor: Masahiko Nakajima, Tokyo, Japan
[73] Assignee: Nakajima Dokosho Company Limited, Tokyo, Japan
[21] Appl. No.: 856,216
[22] Filed: Apr. 28, 1986
[30] Foreign Application Priority Data
  Apr. 27, 1985 [JP]  Japan .................................. 60-92041
[51] Int. Cl.$^4$ .......................... A45D 20/06; F24H 1/00
[52] U.S. Cl. .................................... 432/222; 432/219;
  431/344; 431/255
[58] Field of Search ................ 432/219, 222; 431/255,
  431/344; 126/405, 407, 412, 413; 34/97, 99

[56] References Cited
U.S. PATENT DOCUMENTS

| | | | |
|---|---|---|---|
| 3,589,315 | 6/1971 | Hart | 110/265 |
| 3,612,037 | 10/1971 | Spiggle | 110/344 |
| 3,994,674 | 11/1976 | Baumann et al. | 431/344 |
| 4,133,301 | 1/1979 | Fujiwara | 431/344 |
| 4,539,918 | 9/1985 | Beer et al. | 110/265 |
| 4,552,124 | 11/1985 | Nakajima | 431/344 |
| 4,555,232 | 11/1985 | Raccah et al. | 432/222 |

Primary Examiner—Henry C. Yuen
Attorney, Agent, or Firm—Cushman, Darby & Cushman

[57] ABSTRACT

A hot blow generating device utilizing a liquefied gas as a heat source comprises fuel gas jetting means, air/fuel gas mixture forming means by the ejector effect of the jetting fuel gas, catalytic combustion means formed with a plurality of linear axial gas flow channels, hot blow discharging means, and means for forcively supplying an air stream at least partially to said air/fuel gas mixture forming means depending on the combustion temperature in the device. A hot blow at a great flow rate can be obtained in a structure small in the size and reduced in the weight, safely and conveniently.

4 Claims, 2 Drawing Figures

HOT AIRSTREAM GENERATING DEVICE

BACKGROUND OF THE INVENTION

1. Field of the Invention

This invention concerns a hot airstream generating device and, more specifically, it relates to a hot airstream generating device using an exhaust gas at high temperature obtained by flameless and complete combustion of a liquefied gas.

2. Description of the Prior Art

Heated air streams have generally been used to conduct shrinking or bonding fabrication for heat-shrinkable plastic tubes, molding of plastic materials, melting of soldering flux, etc. As the apparatus for producing air streams at high temperature (hereinafter simply referred to as a hot blow), those of a structure similar to a so-called hair drier comprising a rotary fan for supplying an air stream and an electrical heater for heating the thus supplied air stream to prepare a hot blow have often been employed.

In the prior hot blow generating device, the air stream supplied from the blower is heated by an electrical heater to a temperature, for instance, from 200° to 300° C. which is suitable to the heat processing of heat-shrinkable tubes, etc. mainly made of polyivnyl chloride resins.

However, as the materials for the heat-shrinkable tubes have gradually been replaced with heat-resistant materials such as silicon rubber type materials, it has become necessary to use a hot blow at a temperature as high as from 400° to 500° C. for heat shrinking these materials. Accordingly, the temperature obtained by the hot blow from the conventional electrically heated type hot blow generating device has become insufficient.

Particularly, in such an application use as covering the bundles of power cables or telephone cables with heat-shrinkable tubes, a considerably greater amount of flow rate at higher temperature is necessary for the hot blow. In this case, the rated electrical power required for the hot blow generating device after amounts to about 800 to 1500 KW assuming that the power source therefor is taken from a commercial AC 100 V line, which increases the energy cost, weight and size, as well as complicates the structure of the device.

Further, the electrically heated device inevitably requires power source cords or like other optional equipment, which further add the weight to the device and enforces labourious and troublesome operations to workers upon handling the device. Furthermore, the commercial power source is not always available in the actual working fields such as buildings under construction, common-use tunnels, etc.

In view of the problems in the electric type hot blow generating device, heat of flames obtained from a gasoline torch or liquefied gas torch has occasionally been used for the fabrication of heat-shrinkable tube or the like, but the use of such flames may possibly lead to fire accidents or undesirably damage the materials to be fabricated.

Therefore, the development for a hot blow generating device, which is based on a new concept, reduced in the size and the weight, convenient to handle with, capable of providing a hot blow at a great flow rate and free from fire danger has long been desired but no suitable device has yet been known or put to practical use up to the present as far as we know.

In the field of the soldering iron, a gas heating apparatus using a liquefied gas as a heat source is disclosed by A. Fujiwara in U.S. Pat. No. 4,133,301 and a further improved heat processing device is also proposed by the present inventor in U.S. Pat. No. 4,552,124. As disclosed in these prior U.S. patents, since the liquefied gas is used as the heat source, a great amount of heat can be attained with a structure relatively small in the size and reduced in the weight. Particularly, since the liquefied gas evaporated from the gas reservoir is burnt completely in a flameless manner by the aid of the combustion catalyst, there is no fire accidents at all.

It may thus be considered, theoretically, possible to apply the prior technics disclosed in the filed of the soldering iron to the hot blow generating device for example, by combining the catalytic combustion device with an appropriate blower.

However, different from the soldering iron, the hot blow generating device has to produce a relatively large flow rate of a hot blow at high temperature and this presents various problems to be solved.

At first, if an air stream of a relatively large flow rate supplied from an air blower is merely and directly applied to the gas combustion device, it will excessively dilute the gas mixture, that is, increase the air/fuel gas ratio in the gas mixture failing to ignite a pilot flame prior to the catalytic combustion reaction.

In addition, a great flow rate of the air stream usually at an ambient temperature will over-cool the combustion catalyst to a temperature lower than the optimum catalytic oxidation temperature thus failing to continue stable catalytic gas combustion.

Further, a great amount of heat is often required, for example, in fabricating heat-shrinkable tubes for covering the bundles of power cables or telephone cables as described above. However, a great amount of liquefied gas required for such use can not spontaneously be evaporized from the gas reservoir only due to the pressure difference between the inside and the outside of the reservoir.

Thus, there are various actual difficulties in applying the technical concept in the aforementioned gas soldering iron to the hot blow generating device as the subject of this invention.

SUMMARY OF THE INVENTION

It is, accordingly, the object of this invention to overcome the foregoing drawbacks in the hot blow generating devices in the prior art and to provide a novel hot blow generating device capable of readily obtaining a hot blow of a relatively great flow rate at high temperature with a structure small in the size and reduced in the weight, as well as quite free from fire danger.

The foregoing object can be attained in accordance with this invention by the hot blow generating device utilizing a liquefied gas as a heat source for heating an air stream comprising:

means for jetting out a fuel gas evaporated from a liquefied gas reservoir, means for forming an air/fuel gas mixture by sucking an external air under the ejector effect of the fuel gas jetted out from the means for jetting out the fuel gas, means disposed downstream to the air/fuel gas forming means for igniting the air/fuel gas mixture, means for conducting catalytic combustion having a combustion catalyst formed with a plurality of linear gas channels along the gas flowing direction for allowing the air/fuel gas mixture to pass therethrough and causing the mixture to be in contact with the channel wall thereby attaining flameless and complete catalytic combustion, means for discharging a combustion exhaust gas as a hot blow from the catalytic combustion means, means for forcively supplying an air stream at least partially to the air/fuel gas mixture forming means, and means for starting and stopping the operation of the means for forcively supplying the air stream depending on the combustion temperature.

In accordance this invention, the liquefied gas supplied from the gas reservoir is jetted out from the gas jetting means and mixed with an external air sucked from the outside under the ejector effect of the jetted gas itself to form an air/fuel gas mixture, which is then introduced into the gas channels of the combustion catalyst, subjected to flameless and complete catalytic combustion and then discharged as a combustion exhaust at a high temperature from the hot blow discharging means.

Therefore, a great amount of hot blow at high temperature can readily be obtained with a structure small in the size and reduced in the weight. Further, there is no fire danger at all since the gas mixture is subjected to quite flameless and complete catalytic combustion.

Particularly, the forcive air stream supplying means is kept not operated to attain the optimum composition ratio in the gas mixture composed of the fuel gas and the external air supplied only under the ejector effect of the gas jet at the start of the device, so that the air/fuel gas mixture can reliably be ignited to form a pilot flame. The pilot flame serves to heat the combustion catalyst to a temperature sufficient to start and maintain the catalytic combustion reaction.

Subsequently, the forcive air stream supplying means is started to operate and forcively supplies an additional air stream for providing a hot blow of a sufficient flow rate when the temperature of the combustion catalyst reaches its operation temperature. The supply of the additional air stream then excessively increases the oxygen content in the air/gas fuel mixture to cause minute explosion and put-off the pilot flame as is well-known in the gas burner or the like. Thereafter, the air/fuel gas mixture enriched with air is subjected to flameless and complete catalytic combustion by the heat of the catalyst itself.

In this case, the forcively supplied air stream is branched, that is, it is partially introduced into the air/fuel gas mixture and also partially supplied to the outer circumference of the combustion catalyst. Since a considerable portion of the air stream (usually at a relatively low ambient temperature) is bypassed from the gas channels and used only for increasing the flow rate of the hot blow, over-cooling for the catalyst can be avoided.

The ON-OFF timing for the operation of the air stream supplying means can be attained, preferably, by a heat-sensitive switch that detects the combustion temperature of the device as detailed later.

In a preferred embodiment, a heat exchanger constituting a midway of a gas pipeway from the gas reservoir to the gas jetting means is disposed near the combustion catalyst. The liquefied gas passing through the pipeway is heated by the heat of the combustion catalyst to promote the complete evaporization of the liquefied gas from the gas reservoir thereby enabling to increase the evaporizing rate of the gas effectively.

DESCRIPTION OF THE ACCOMPANYING DRAWINGS

These and other objects, features, as well as advantageous effects of this invention will become apparent by reading the descriptions for a preferred embodiments according to this invention while referring to the accompanying drawings, wherein FIG. 1 is a cross sectional view for a hot blow generating device of a preferred embodiment according to this invention; and FIG. 2 is an exploded perspective view for a portion of the hot blow generating device shown in FIG. 1.

DESCRIPTION OF THE PREFERRED EMBODIMENT

A preferred embodiment according to this invention will now be explained referring to the accompanying drawings.

Figure 1:
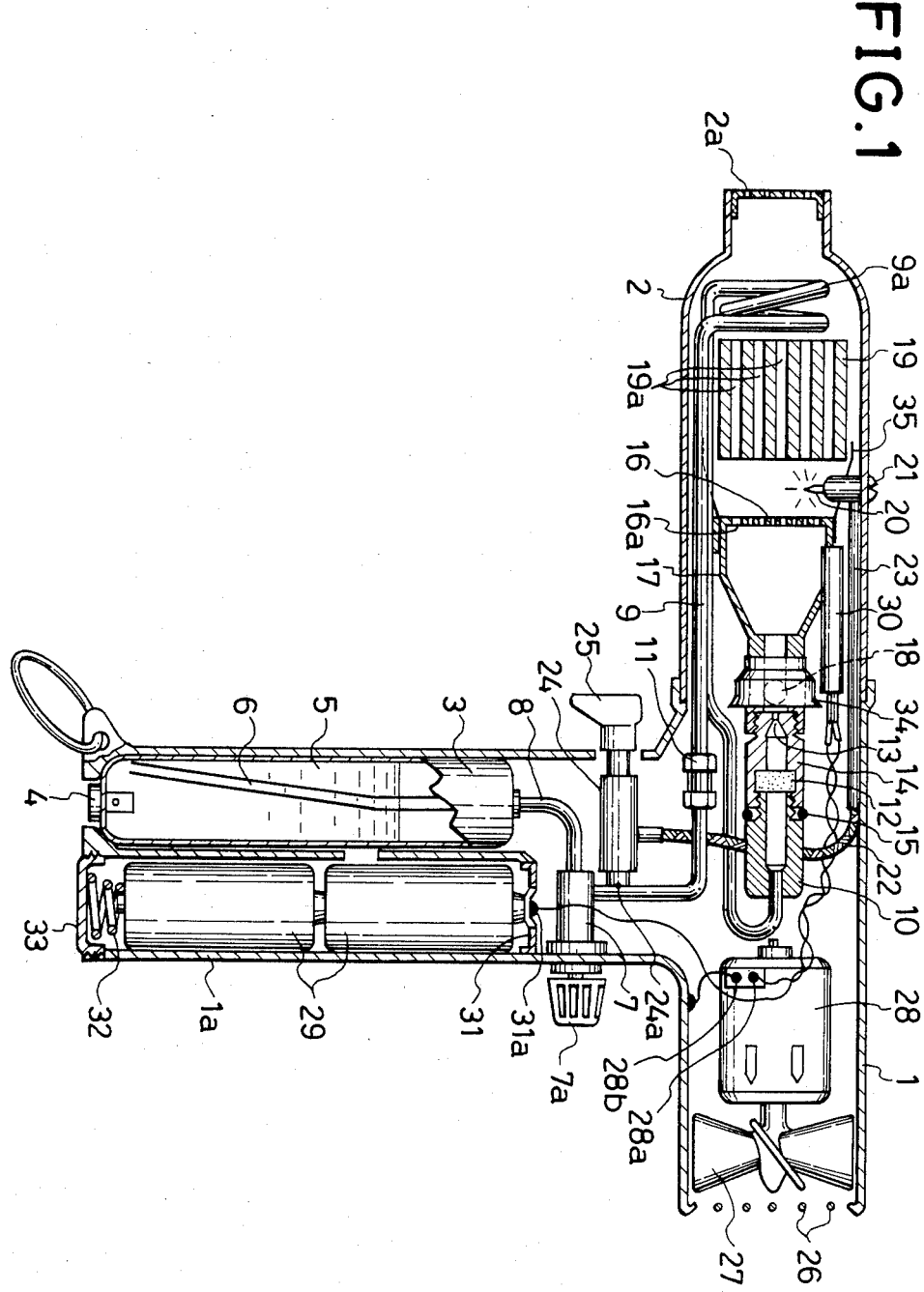

In FIG. 1, a hot blow generating device of a generally T-shaped hollow structure comprises a horizontal main body 1 and a vertical grip portion 1a. A cylindrical combustion casing 2 is connected to the downstream end of the main body 1 and has a hot blow discharge port 2a formed at the downstream end thereof.

As shown in FIG. 1, a fuel reservoir 3 having an injection valve 4 formed at its bottom is incorporated to the inside of the grip portion 1a. A liquefied gas sucking member 6 made, for example, of porous material is immersed in a liquefied gas 5 filled in the fuel reservoir 3 for sucking the liquefied gas 5 and introducing the gas by way of a gas pipeway 8 and a heat exchanger pipeway 9 (detailed later) to a final gas joint 10. A valve 7 such as a needle valve capable of finely controlling the flow rate of the liquefied gas 5 is disposed at the midway of the pipeway 8.

An operating knob 7a for the valve 7 is situated to the outside of the grip portion 1a as shown in FIG. 1 and so adapted that the opening degree of the valve 7 is adjusted by rotating the operation knob 7a to control the flow rate of the liquefied gas 5 sucked from the fuel reservoir 3. Both of the gas pipeway 8 and the heat exchanger pipeway 9 are made of tubular metal and, particularly, the heat exchanger pipeway 9 is made of highly heat conductive metal material such as of copper or bronze. As shown in FIG. 1, the intermediate portion of the heat exchanger pipeway 9 is wound spirally by 2–3 turns into a coil-like configuration to constitute a heat exchanger 9a just near the hot blow discharge port 2a of the combustion casing 2. The gas pipeway 8 and the heat exchanger pipeway 9 are connected detachably with each other by means of attaching joints 11.

The final gas joint 10 has a cylindrical shape made of metal material and connected at its downstream end to the mating end of a gas exit member 14 made of metal, which incorporates therein a filter 12 made of sintered particles of stainless steels or copper alloys of 20–50 $\mu m$ particle size and having an orifice 13 of 100–300 $\mu m$ $\phi$ formed at its downstream end. The gas joint 10 and the gas exit member 14 are screw-coupled to each other and sealed with an O-ring 15 at the coupled portion.

Figure 2:
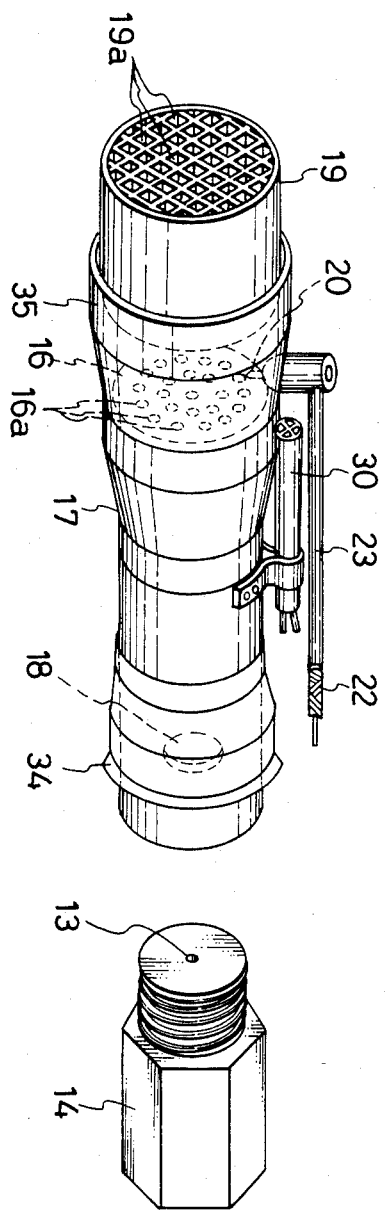

As shown in FIG. 1 and, more clearly, in FIG. 2, the downstream end of the gas exit member 14 is screw-coupled to the mating end of a metal nozzle 17 which is converged toward downstream and attached at its most downstream end face with a fire nozzle port 16 made of metal and having a plurality of apertures 16a. Also as shown in FIGS. 1 and 2, an air suction port 18 is formed to the nozzle 17 at a position corresponding to the exit of the orifice 13 for sucking an external air under the ejector effect of the liquefied gas 5 jetted out from the orifice 13 at a flow rate, for example, from 100 to 300 m/sec, so that the liquefied gas 5 jetted out from the orifice 13 and the air sucked through the air suction port 18 are mixed in the nozzle 17 into an air gas mixture and jetted out from the fire nozzle port 16.

A combustion catalyst 19 is disposed between the fire nozzle port 16 and the heat exchanger 9a for the flameless and complete combustion of the air/fuel gas mixture jetted out from the fire nozzle port 16 as shown in FIG. 1. Further, a spark plug 20 is disposed between the combustion catalyst 19 and the fire nozzle port 16 for igniting the air/fuel gas mixture jetted out from the fire nozzle port 16.

The combustion catalyst 19 comprises a noble metal catalyst such as platinum or palladium carried on a support made of cordierite or mullite type ceramics, which are highly heat shock-resistant and for which the catalyst can be deposited readily. The catalyst support has a cylindrical shape in which a plurality of linear channels 19a are formed axially (in the gas flow direction) in a lattice-or honeycomb-like configuration so as to improve the smooth flow of the air/fuel gas mixture and thus reduce the pressure loss, as well as ensure the sufficient contact of the air/fuel gas mixture with the wall of the catalyst.

The combustion catalyst 19 is prepared, for example, by immersing a porous ceramic support into an aqueous 1% solution of chloro platinic acid rendered acidic by hydrochloric acid, impregnating the support with the catalyst component under vacuum, drying and then subjecting them to reduction in a hydrogen gas stream.

Also as shown in FIG. 1, the spark plug 20 is secured by way of an attaching screw 21 to the inside of the combustion casing 2. A high voltage cable 22 from the spark plug 20 is led out through an insulation porcelain 23 and connected to a piezoelectric element 24 disposed in the grip portion 1a. The grounding side 24a of the piezoelectric element 24 is connected to the gas pipeway 8.

An ignition button 25 for actuating the piezoelectric element 24 is disposed being projected to the outside of the grip portion 1a and so adapted that sparks are generated between the spark plug and the fire nozzle port 16 upon actuation of the ignition button 25 to ignite the air/fuel gas mixture jetted out from the fire nozzle port 16.

A rotary blower 27 and a small motor 28 for rotationally driving the blower 27 are incorporated respectively to the inside at the upstream end of the main body 1 for forcively supplying an external air to the inside of the main body 1 through a guard metal gage 26 mounted to the opening at the end of the main body 1 as shown in FIG. 1. Dry cell batteries 29 (hereinafter referred to as dry cell 29) are incorporated to the inside of the grip portion 1a as the power source for the small motor 28. The dry cell 29 and the small motor 28 are connected with each other by way of a heat-sensitive switch 30, for example, a bimetal switch, which is closed upon sensing a predetermined combustion temperature of the device.

The cathode of the dry cell 29 is in contact with a cathode plate 31a formed on an insulation plate 31 disposed within the grip portion 1a and the anode of the dry cell 29 is supported by way of an anode spring 32 on a cap 33. The cathode plate 31a is connected by way of the heat-sensitive switch 30 to the positive electrode 28a of the small motor 28 and the negative electrode 28b of the motor 28 is connected by way of the grip portion 1a, the cap 33 and the anode spring 32 to the anode of the dry cell 29.

It is adapted such that when the heat-sensitive switch 30 is closed to complete an electrical current supply circuit from the dry cell 29, the small motor 28 is started to drive the blower 27 rotationally, by which a portion of an external air stream is forcively introduced by way of the air suction port 18 to the inside of the nozzle 17, while the remaining portion of the air stream is supplied passing through the outer circumference of the nozzle 17 and the combustion catalyst 19 to the hot blow discharge port 2a of the combustion casing 2.

As shown in FIGS. 1 and 2, a pilot frame extinguishing skirt 34 that converges from the side of the blower 27 is attached at the outer circumference of the air suction port 18 of the nozzle 17 so that the air stream sent from the blower 27 can positively be introduced into the air suction port 18. Further, a cylindrical blower guide 35 is attached to the outer circumference at the downstream end of the nozzle 17 for preventing the direct abutment of the air stream from the blower 27 to the combustion catalyst 19, which would otherwise over-cool the combustion catalyst 19.

OPERATION OF THE DEVICE

The operation of the hot blow generating device having thus been constituted will now be explained.

At first, for starting the operation of the device, the operating knob 7a is turned to open the valve 7. Then, the liquefied gas 5 in the fuel reservoir 3 is evaporated and sucked through the sucking member 6 due to the pressure difference between the outside and the inside of the reservoir 3. The gas is then introduced by way of the gas pipeway 8 and the heat exchanger pipeway 9 into the final joint 10 and, further passed through the filter 12 in the gas exit member 14 where obstacles contained in the gas are eliminated. The thus cleaned gas is jetted out from the orifice 13 into the nozzle 17 at a flow velocity of about 100–300 m/sec.

When the liquefied gas 5 is jetted out from the orifice 13, an external air is sucked through the air suction port 18 into the nozzle 17 by the ejector effect of the jetted gas, by which the liquefied gas 5 and the external air are mixed in the nozzle 17 and then the thus formed air/fuel gas mixture is jetted out of the fire nozzle port 16.

When the ignition button 25 is actuated in this state, piezoelectric sparks are generated between the spark plug 20 and the fire nozzle port 16 to ignite the air/fuel gas mixture jetted out from the fire nozzle port 16 and, thereby, the air/fuel gas mixture is put to flaming combustion at the face of the fire nozzle port 16. Then, the combustion catalyst 15 is heated to its reaction starting temperature (about 180° C.) by the heat of the pilot flame. The temperature of the nozzle 17 also rises by the heat from the fire nozzle port 16 within a period of 5–10 sec after the ignition, by which the heat-sensitive switch 30 is closed to complete an electrical power supply circuit and thereby start the small motor 28.

Meanwhile, the heat exchanger 9a is heated by the combustion exhaust gas to completely evaporize the liquefied gas 5.

When the motor 28 is started, the blower 27 is driven rotationally to supply the external air to the inside of the main body 1 in an amount sufficient to give a desired flow rate of the hot blow. The thus supplied additional air stream is partially passed along the outer circumference of the nozzle 17 and of the combustion catalyst 19 to the hot blow discharge port 2a of the combustion casing 2, while partially introduced by way of the flame extinguishing skirt 34 through the air suction port 18 to the inside of the nozzle 17. As a result, the air ratio in the gas mixture in the nozzle 17 is increased excessively, to cause minute explosion and put off the pilot flame as is well-known in the case of an excessive supply of air, for example, in a gas burner. Thereafter, the air/fuel gas mixture is supplied as it is with no flaming combustion to the combustion catalyst 19. In this case, since the combustion catalyst 19 has already been heated to the reaction temperature as described above, the air-enriched gas mixture jetted out from the fire nozzle port 16 is catalytically burnt in contact with the combustion catalyst 19 and the catalytic combustion is continued hereinafter. The combustion caused by the combustion catalyst 19 is quite flameless and complete catalytic combustion. The combustion exhaust from the combustion catalyst 19 is mixed with a portion of the air stream supplied from the blower 27 and passed through the outer circumference of the combustion catalyst 19 in the inside at the downstream end of the combustion casing 2 and the hot blow thus increased for the flow rate and cooled to a desired temperature as a result of mixing is exhausted from the hot blow discharge port 2a. The temperature of the hot blow is controlled within a range, for example, from 100° to 500° C. by adjusting the opening degree of the control valve 7.

In an application use where the flow rate of the evaporated gas used for the combustion is as low as less than 200 cc per minute, the liquefied gas can be spontaneously evaporized at an ambient temperature and, accordingly, the heat exchanger 9a is not always necessary.

However, if the temperature of the hot blow discharged from the hot blow discharge port 2a is set to 400°–500° C., about 300–500 cc per minute of gas flow rate is required, but effective evaporization of such a great amount of gas flow rate is difficult by the ordinary method. Specifically, if the flow rate of the liquefied gas is greater than 200 cc per minute, only the spontaneous evaporization at the ambient temperature is insufficient and the liquefied gas not yet evaporated completely, that is, containing relatively coarse liquid particles is jetted out as it is from the nozzle 17 failing to attain normal combustion, but may possibly produce abnormally large flames out of the hot blow discharge port 2a.

Provision of the heat exchanger 9a enables to completely vaporize a great amount of liquefied gas and eliminate the foregoing disadvantage.

In the case of interrupting the catalytic combustion, the operating knob 7a is turned to the opposite direction to close the valve 7. Then, since the gas is no more supplied to the nozzle 17, the combustion in the combustion catalyst 19 is interrupted. By the way, the blower 27 does not instantly stop if the combustion at the combustion catalyst 19 is interrupted but the blower 27 keeps to supply the external air stream till the temperature of the nozzle 17 is lowered to a predetermined temperature set to the heat-sensitive switch 30 (for example, lower than 200° C. where there is neither ignition nor fire danger). Accordingly, even if the hot blow working is interrupted at a high temperature state, the hot blow generating device can be cooled to a moderate temperature by the forcive air cooling to secure the operation safety.

Since the hot blow is obtained in this device by mixing the combustion exhaust of the liquefied gas 5 and the air stream from the blower 27, etc. it is possible to remarkably reduce the size and the weight of the device as compared with the conventional device utilizing the electric energy as the heat source. Further, a hot blow in a broad range from high to low temperatures can be obtained by merely controlling the combustion gas flow rate, and the flow rate of the hot blow can always be kept constant.

Further, since the air from the blower 27 is forcively introduced into the nozzle 17 and, in addition, the blower 27 is started or stopped automatically by the heat-sensitive switch 30, no delicate judgment is necessary for the timing of switching the initial pilot combustion at the fire nozzle port 16 to the frameless combustion at the combustion catalyst 19, which can facilitate the manipulation and eliminate the misoperation of the device.

Further, since the air stream supplied from the blower 27 is branched and only a portion of the air stream is passed through the gas channels of the combustion catalyst 19, cover-cooling for the catalyst can be avoided while ensuring a sufficient flow rate for the hot blow as a result of joining the two branched portions of the air stream again at the discharge port 2a.

Further, since the air supplied passing along the outer circumference of the combustion catalyst 19 cools the combustion casing 2, the temperature of the casing 2 can be maintained lower, thus ensuring the handling safety.

Furthermore, since the considerable portion of the hot blow is composed of the combustion exhaust, the oxygen content therein is extremely lower as compared with the ordinary hot blow solely composed of the atmospheric air, to ensure a safety even in the hot blow fabrication of burnable materials.

For instance, in our experiment of exposing a cloth piece impregnated with gasoline to a hot blow at 550° C. exhausted from the hot blow discharge port 2a, it could be confirmed that ignition did not occur at all. It may be attributable to that the hot blow discharged from the port 2a is basically composed of combustion exhaust and, accordingly, lacks in a sufficient oxygen content to burn the cloth piece.

In addition, since the fuel reservoir 3 and the dry cell 29 are incorporated to the inside of the grip portion 1a, the device can be designed as a cordless structure, which enables to reduce the size and the weight of the device, while enabling hot blow fabrication continuously for a long period of time.

Although the foregoing descriptions have been made to the embodiment of the cordless structure, it may also be possible to dispose the fuel reservoir 3 separately from the main body 1 and connect it by way of a tube to the valve 7. In this modified structure, the size and the weight of the device can be reduced by so much of the fuel reservoir 3.

Further, although the explanation has been made to the embodiment in which the small motor 28 is rotated at a constant speed for making the air flow rate from the blower constant, the number of rotation of the small motor 28 may be adjusted to control the air stream flow rate supplied from the blower 27.

Furthermore, the configuration of the heat exchanger 9a may not necessarily be limited only to the illustrated coiled shape, but a structure using flat plates assembled into the same configuration as that of the inside of the combustion catalyst 19 may also be used. In the case of using hot blow at a low flow rate, the heat exchanger 9a may be saved.

Although the explanation has been made to the embodiment as described above, in which the air from the blower 27 is only partially supplied forcively into the nozzle 17, the air may entirely be supplied into the nozzle 17 in such a device where the air flow rate from the blow 27 is so small that there is no possibility of over-cooling the combustion catalyst 19.

As has been described above according to this invention, the air/fuel gas mixture is at first put to flaming pilot combustion to rise the temperature of the combustion catalyst to its catalytic reaction temperature, and then the combustion flame is extinguished by the air stream supplied forcively from the blower to the gas mixture generating portion to transfer the flaming pilot combustion into the flameless complete combustion by the combustion catalyst. Therefore, a great amount of vigorous hot blow at high temperature can be obtained easily in a device small in the size and reduced in the weight. In addition, since the combustion exhaust is utilized as the hot blow, the fire danger or the like can be reduced drastically to ensure the working safety as compared with the electrical hot blow device that utilizes the atmospheric air directly, as well as the torch lamp type device that utilizes the burning gas flame itself.

What is claimed is:

1. A hot airstream generating device using a liquefied gas as a combustible fuel source for heating an airstream to produce a hot airstream, comprising:
   (a) means for jetting out a fuel gas evaporated from a liquefied gas reservoir;
   (b) means for sucking external air using the ejector effect of said fuel gas jetted out from said fuel gas jetting means to form an air-fuel gas mixture;
   (c) means for conducting catalytic combustion, said catalytic combustion means including a combustion catalyst formed with a plurality of gas channels substantially parallel to the air-fuel gas flow direction for the air-fuel gas mixture to pass therethrough and undergo flameless, substantially complete catalytic combustion;
   (d) means for discharging a combustion exhaust gas as a hot airstream from said catalytic combustion means;
   (e) means disposed downstream to said air-fuel gas mixture forming means and upstream to said catalytic combustion means for igniting said air-fuel gas mixture, thereby forming a temporary pilot flame for heating said catalytic combustion means before starting the catalytic combustion;
   (f) means for forceably supplying an air stream at least partially to said external air sucking means, thereby extinguishing said pilot flame after the catalytic combustion has started, said means for forceably supplying an airstream being actuated by an electrically driven means;
   (g) means for sensing the temperature of the catalytic combustion and closing a power supply circuit for said electrically driven means when said temperature reaches a predetermined catalytic combustion temperature;
   (h) an orifice having an outlet for jetting out a liquefied fuel gas supplied from said liquefied gas reservoir including a gas flow control valve;
   (i) an air suction port disposed at said outlet of said orifice for sucking external air under the ejector effect of said fuel gas jetted out from said orifice to produce an air-fuel gas mixture through a port having a plurality of apertures;
   (j) a spark plug disposed downstream of said aperatured port for igniting the air-fuel gas mixture jetted out therefrom;
   (k) a combustion catalyst having a plurality of linear gas flow channels;
   (l) a heat-sensitive switch connected to said port for detecting the temperature of the gas combustion and producing a signal at a predetermined temperature to close a power supply circuit for said motor;
   (m) a heat exchanger constituting a portion of a gas supply pipeway extending from said gas reservoir to said orifice and situated just downstream of said combustion catalyst so as to heat and vaporize the liquefied gas in said supply pipeway by heat exchange with the heat of the exhaust gas discharged from said combustion catalyst;
   (n) a hot airstream discharge port disposed downstream of said heat exchanger; and
   (o) a blower actuated by a motor for forceably supplying external air partially into said air suction port and partially along the outer periphery of said combustion catalyst.

2. A hot airstream generating device as claim 1 wherein the air from the means for forceably supplying the airstream is partially introduced into the external air sucking means and partially supplied to the outer periphery of said catalytic combustion means.

3. A hot airstream generating device as claim 1, wherein a means for heat exchange conducting said fuel gas sucked from said liquified gas reservoir is disposed and heated downstream of said catalytic combustion means for promoting substantially complete vaporization of said liquified gas.

4. A hot airstream generating device as in claim 1 wherein said gas channels in said catalytic combustion means have a substantially circular cross-section.

* * * * *